United States Patent [19]

Connolly

[11] Patent Number: 5,629,675
[45] Date of Patent: May 13, 1997

[54] VEHICLE INTRUDER DETECTION SYSTEM

[75] Inventor: John Connolly, Farnborough, United Kingdom

[73] Assignee: The Secretary of State for Defence in Her Britannic Majesty's Government of the United Kingdom of Great Britain and Northern Ireland, Whitehall, England

[21] Appl. No.: 454,278
[22] PCT Filed: Nov. 10, 1993
[86] PCT No.: PCT/GB93/02311
  § 371 Date: Jul. 18, 1995
  § 102(e) Date: Jul. 18, 1995
[87] PCT Pub. No.: WO94/13516
  PCT Pub. Date: Jun. 23, 1994

[30] Foreign Application Priority Data

Dec. 16, 1992 [GB] United Kingdom .................. 9226217

[51] Int. Cl.$^6$ ........................................... G08B 13/00
[52] U.S. Cl. ........................ 340/565; 340/426; 340/541
[58] Field of Search .................................. 340/565, 566, 340/550, 545, 541, 665, 426; 200/506, 511

[56] References Cited

U.S. PATENT DOCUMENTS 3,751,615  8/1973  De Loisy ........................ 200/86 R
4,230,918  10/1980  Schroeder et al. ................ 340/545 X
4,628,300  12/1986  Amato ........................... 340/426 X
5,392,024  2/1995  Kiuchi et al. ................... 340/665 X

FOREIGN PATENT DOCUMENTS 0191906  8/1986  European Pat. Off. .
0297940  1/1989  European Pat. Off. ............ 340/550
2145032  2/1973  France .
2409588  6/1979  France .
3923608  4/1990  Germany ....................... 340/426
270172  5/1927  United Kingdom .
407184  3/1934  United Kingdom .
630450  10/1949  United Kingdom .
753018  7/1956  United Kingdom .
900731  7/1962  United Kingdom .
908953  10/1962  United Kingdom .
2083858  3/1982  United Kingdom .

*Primary Examiner*—Thomas Mullen
*Attorney, Agent, or Firm*—Nixon & Vanderhye P.C.

[57] ABSTRACT

A vehicle intruder detection system including at least one pressure operated switch which comprises a first, movable, conductive strip contact and a second, fixed, conductive strip contact. The second contact is attached to a fixed surface located within a vehicle interior so that the first contact is located in proximity, but not fixedly attached, to an internal face of a vehicle window. Each switch is connected into a circuit which incorporates an alarm, which is then triggered by application of a force to the external surface of a window sufficient to bring the first and second contacts together to close one of the switches.

9 Claims, 4 Drawing Sheets

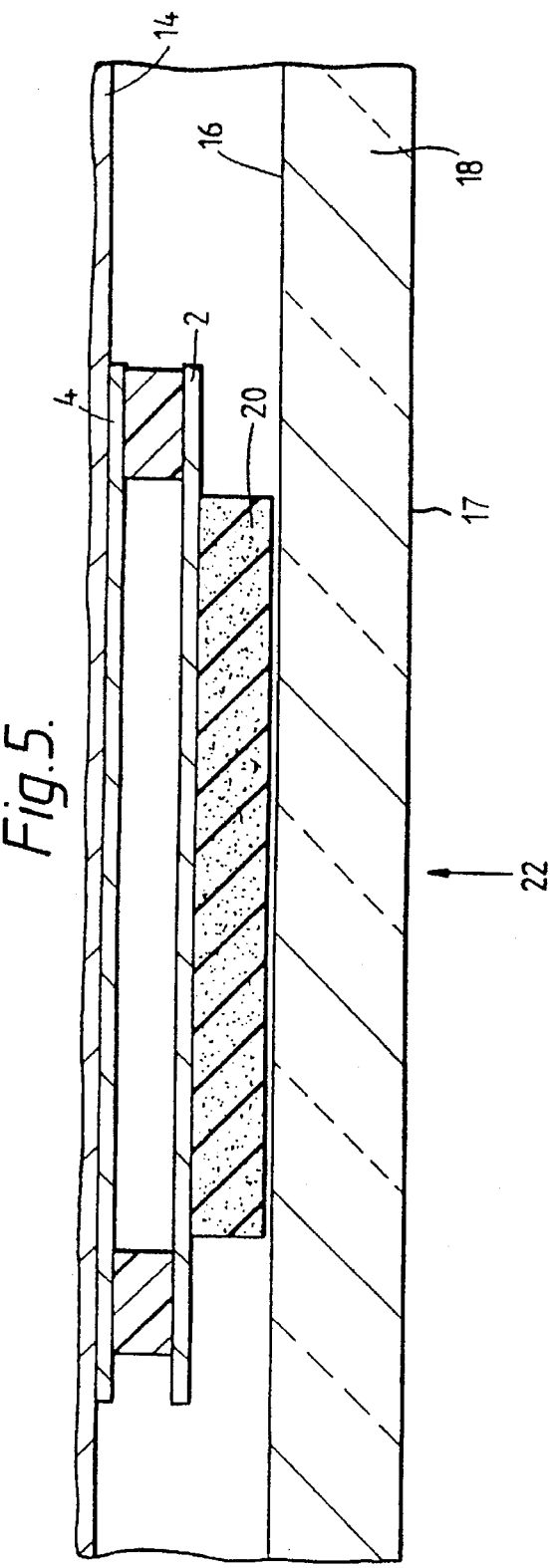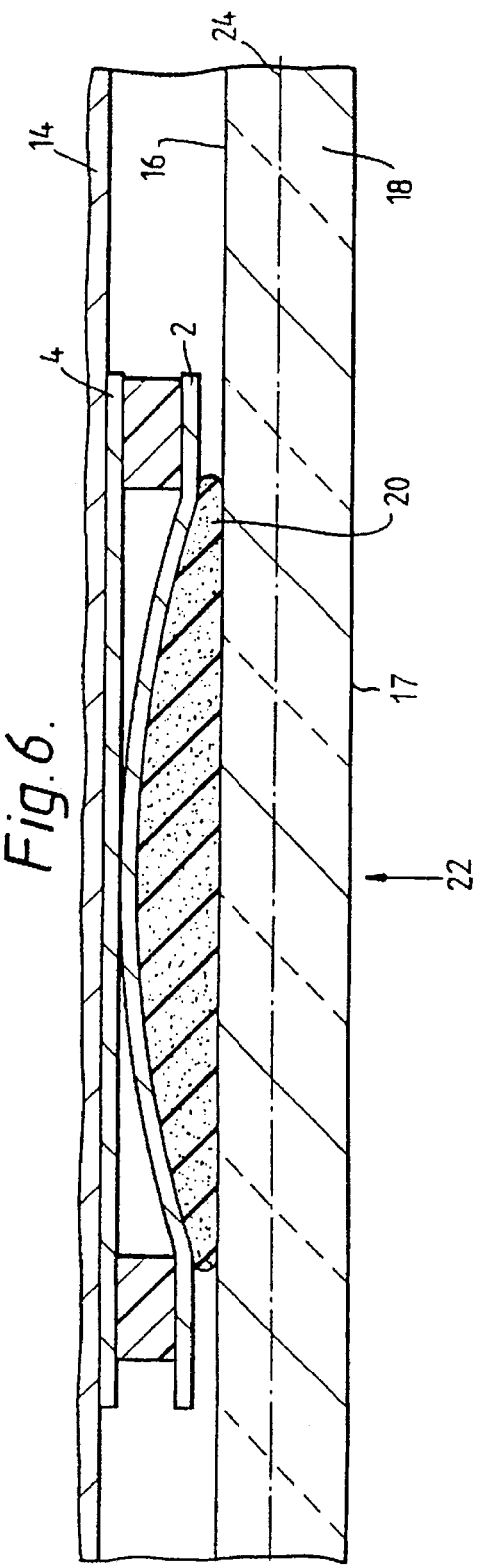

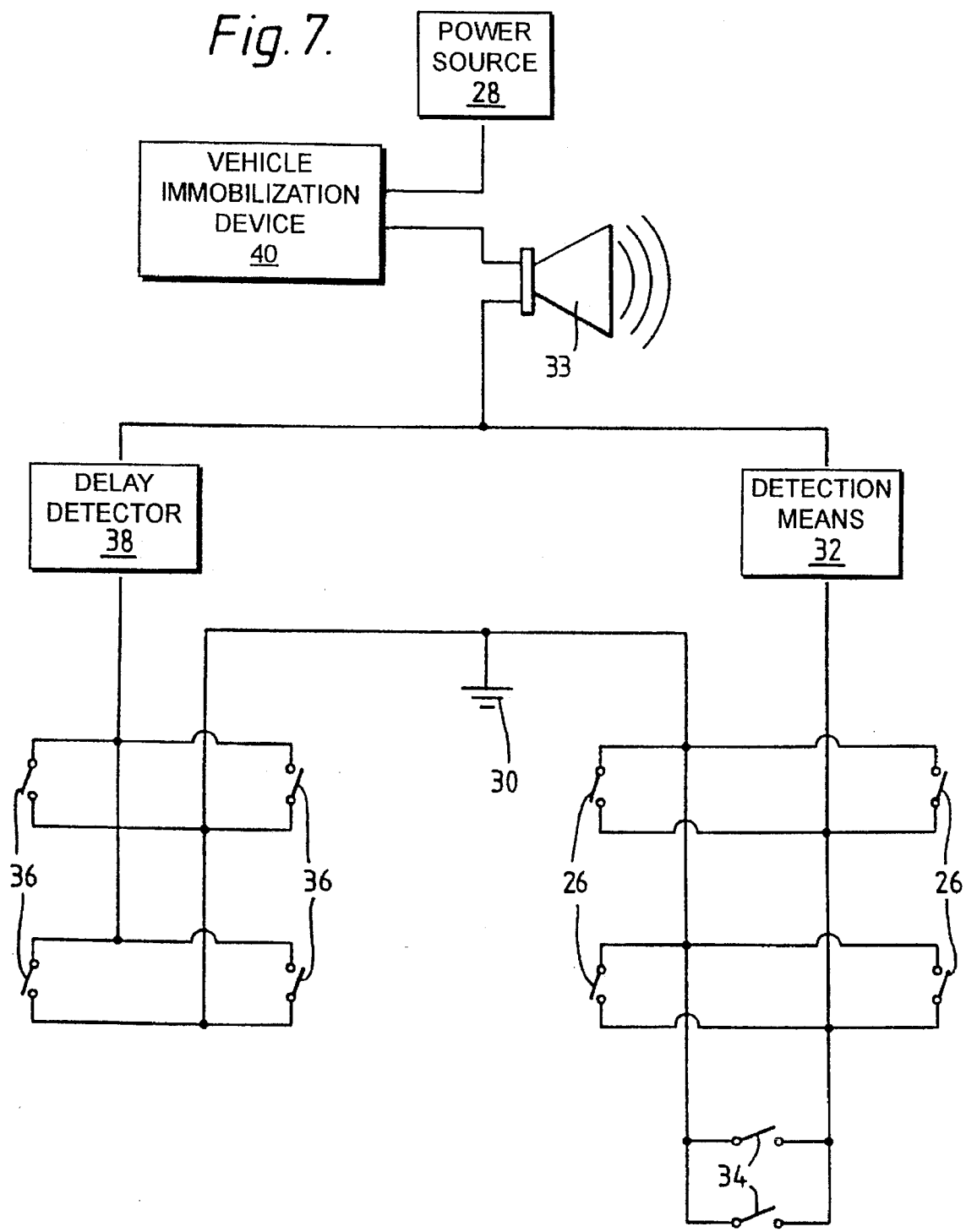

VEHICLE INTRUDER DETECTION SYSTEM

BACKGROUND OF THE INVENTION

1. Field of the Invention

The present invention relates to vehicle intruder detection and alarm systems incorporating pressure operated switches.

2. Discussion of prior Art

The simplest form of vehicle intruder detection system incorporates switches into the doors in the form of electrical contacts, which are then arranged in a circuit so as to trigger an alarm when a door is opened. Such switches are usually configured so as to close when a door is opened, in a similar mechanism to that employed for operating courtesy lights, thereby completing a circuit from vehicle battery to earth to trigger an alarm, and may be additionally located on the bonnet and boot. Although the bonnet and boot switches are made to operate instantaneously, the door switches usually incorporate a few seconds delay. Such a system offers only limited protection against intruders entering a vehicle, and less against theft from a vehicle, in that it detects only an open door and is not triggered when a window is broken or tampered with.

A number of more sophisticated intruder detection systems have been developed which attempt to address the problem of detecting attempted intrusion into a vehicle via the full range of vulnerable sites (door, window, boot, bonnet or similar vulnerable area). A problem common to all such alarm systems has been the difficulty in achieving adequate sensitivity to unauthorized interference with a vehicle without a tendency to suffer from false alarms.

A commonly used system for the detection of unauthorized interference with a vehicle involves the provision of an alarm system including one or more vibration transducers, typically utilizing a piezoelectric material, in combination with a detector and alarm which respond when the transducer is disturbed by a particular level of vibration. These transducers are most usefully located at sites particularly vulnerable to intruder attack, and will generally be located on the doors in the vicinity of the window glass so as to detect disturbance and vibrations in the glass.

Transducers of this type exhibit an analogue response to vibration with a relatively low signal: noise ratio, and as such are particularly difficult to calibrate to adequate sensitivity to ensure that interference with the vehicle is consistently detected without being prone to false alarms. They are susceptible to being triggered by accidental shocks to other parts of the vehicle, such as might be caused by a legitimate passer by, an animal, a child's ball or similar accidental impact with the vehicle, and may even be triggered by the vibrations associated with passing traffic or stormy weather.

More sophisticated vehicle intruder detection alarms may be fitted with ultrasonic sensors, which register changes to the sound signature between transmitter and receiver caused by movement, thereby triggering the alarm. Disadvantageously, the variation in sound signature caused by movement is a relatively weak signal relative to the background noise encountered in practical use, and renders such systems susceptible to problems of calibration. These systems exhibit a tendency to false alarms triggered by noise from passing traffic, and also fail to detect gradual movement, so that, particularly in the absence of conventional door alarms, a vehicle fitted with an ultrasonic system is vulnerable to the intruder who opens a passenger door sufficiently slowly, and objects may then be removed from inside the vehicle without the alarm having been triggered.

The incorporation of devices which detect breaking of a window, such as a switch configured to interact with an intact window in such a way as to be switched to an alternate state on breakage or a strip of conductive material on the glass surface have also been considered. An example of the first type of device is disclosed in DE-A-3 923 608 in which a push button bears against a window when intact and causes an electrical switch to operate when the window is broken. The second principle is well known from strip systems frequently used on large plate glass (eg shop) windows, and relies on the assumption that the material in the strip will sever when the glass breaks, opening the circuit and thereby triggering an alarm. This method has been found to present problems as it cannot be reliably assumed that the window glass will craze uniformly and it is possible that the part of the window to which the sensor material was attached would remain intact, so that triggering of the alarm in the intruder detection system when the window was broken could not consistently be guaranteed. Furthermore, it is generally desirable for an alarm to be triggered by any significant level of interference, even if the window is not immediately broken thereby.

This difficulty can be overcome by applying a conductive coating to the whole window glass surface, so that any break in the glass would affect the resistance of the window, and an alarm could be triggered thereby. Such a system is particularly expensive, both because of the costs arising from application of the coating, and because the only practical quality control test is to break a proportion of the coated windows. It is also impractical to apply to existing vehicles as complete windows would have to be replaced.

Furthermore, all systems which involve a detector located on a window present practical problems with openable windows: the need to attach wires to the windows which do not interfere with the window winding mechanism would necessitate working between the inner and outer skins of the door assembly, making installation complex.

SUMMARY OF THE INVENTION

It is an object of the present invention to provide a simple alternative to existing intruder detection systems which mitigates the above disadvantages.

Thus according to the invention there is provided a vehicle intruder detection system comprising at least one pressure operated switch connected into a circuit with an electrical source and detection means capable of detecting variations in the state of the circuit, wherein each switch has a first, movable contact and a second, fixed contact, each contact comprising a strip of electrically conductive material, and at least one spacer element of electrically insulating material located between the first contact and the second contact whereby contacts are spaced apart from one another, the second contact being attached to a fixed surface located within a vehicle interior so that the first contact is located in proximity, but not fixedly attached, to an internal face of a vehicle window, such that the application of a predetermined force to the external surface of the protected window causes the first and second electrical contacts to be brought into contact by displacement of the first electrical contact thereby actuating the switch.

Such a switch in use in a vehicle as part of an intruder detection system shows a clearly defined response to a displacement of a vehicle window arising from the application of force to the external surface of that window. The switch is open in the absence of an applied force and remains in the open state when an applied force is less than a predetermined critical force, at which applied force the corresponding displacement of the first contact is sufficient to close the switch. The switch consequently offers an excellent signal: noise ratio and overcomes many of the calibration problems associated with those of the prior art devices exhibiting an analogue response to vehicle interference.

The electrical source used will most simply be the vehicle battery. The detection means may comprise any device exhibiting a response to the change in the electrical state of the circuit resulting from the closure of the or a switch, such as a device for monitoring changes in the current through the circuit or the voltage across it.

The switch is closed by the displacement of the window, so that detection is confined principally to the protected window. In normal operation the switch is actuated only when the glass is struck with a malicious intent, and with sufficient force to cause a displacement large enough to close the switch. A response in the switch is unlikely to result from impacts with other parts of the vehicle. The use of the switch also reduces considerably instances of false alarm arising from extraneous effects such as noise variation and vibration from vehicles or other local sources, rain, wind, and radio frequency interference.

A further advantage of the switch used in the present present invention is that it is a simple device which can be fitted readily and at little cost to existing vehicles. Because the switch is fixed on the vehicle and not fixed to the window it is appropriate to the openable windows, which constitute a major vulnerable sight in practice, as vertical movement of the window in normal use is possible without interference with the switch, and any wiring into an alarm circuit can be kept away from the winding mechanism. To facilitate its connection each switch in the system may advantageously further comprise electrical connection means for connecting the switch into a circuit, comprising a wire of conducting material connected to each contact. The wire may be soldered to the face of the contact, or alternatively each contact may further comprise a tab of electrically conductive material narrower than the remainder of the contact and extending from one end thereof, to provide a convenient site for the connection of the wire. Such connection may be effected by soldering the wire to the tab, but a more reliable joint is provided if the wire is mechanically crimped onto the tab, and the tab is preferably configured so as to facilitate such a joining process.

Each switch is preferably contained within a water-impermeable sheath, which provides protection from moisture induced degeneration over time, and also offers mechanical protection and support to connecting wires an electrical connections.

When a force is applied to a vehicle window fitted with the system, the force on the window may be transferred to the first contact of the switch by direct contact, the switch being initially positioned so that the first contact lies very close to the internal surface of the window and is thus brought into contact thereto by negligible lateral displacement of the window under the applied force, so that the switch is then closed by compression of the at least one spacer element until the first contact is brought into contact with the second contact. However, the switch is preferably provided with a force transmission means of flexible, resilient material connected to the first contact so that in use the force transmission means is located between the window and the first contact thereby enabling the inward movement of the window caused by an external force thereon to be transmitted to the first contact of the switch. The configuration of and materials used for the force transmission means may then be varied to adjust the sensitivity of the switch, and to permit a switch to be configured appropriately for the gap between window and fixed surface of vehicle interior in which it is located so as to be actuated by a predetermined displacement of the window.

The fixed surface to which the second contact of the switch is attached is preferably the internal surface of the vehicle door trim adjacent to a window. This site provides a fixed surface and a gap of a suitable distance to the window to be protected where installation is straightforward. This site is particularly appropriate where the window in question is an openable vehicle window, as these are necessarily more loosely fitted and a suitable gap is available where the switch can be fitted in existing vehicles, and incorporated simply into existing intruder alarm systems if appropriate, without the necessity to remove the window.

The detection system preferably comprises a plurality of switches connected in parallel to each other, such that actuation of any one switch causes the circuit to be completed. The plurality of switches may be arranged to provide protection for several windows, and this arrangement enables a detectable response to be transmitted to the detection means in the event of interference at any one window so protected actuating an associated switch.

The switches are preferably additionally connected in parallel to conventional switches located at the bonnet and boot of the vehicle, of the type where the contacts are caused to close when the bonnet or boot is opened. They may also be additionally connected in parallel to similar conventional switches located at the passenger doors of the vehicle. In this case the door switches are preferably connected in a parallel array to a detection means which includes a delay device such that a response is not generated by the detection means until a specified time interval after the signal is detected, the switches according to the invention and the boot and bonnet switches are preferably connected in a parallel array to a detection means which generates a response the instant the signal is detected, and the two array/detection means combinations are then connected in parallel. Intruder detection systems according to the present invention therefore offer a particular advantage for use in existing vehicles with an existing vehicle intruder detection system comprising only conventional door and similar switches, being readily incorporated into the existing system to produce significantly enhanced protection.

The detection means preferably incorporates an alarm which is actuated on detection of a change in current through the system. The alarm can be visual, audible, or both, and preferably utilizes existing vehicle equipment, such as by sounding the horn or flashing the headlights. The detection means may also incorporate a vehicle immobilisation means which is similarly actuated. Various known immobilisation means, such as fuel supply cut-out or ignition cut out, are appropriate.

BRIEF DESCRIPTION OF THE DRAWINGS

The invention will now be described by way of example only with reference to the accompanying drawings, in which:

FIG. 5 is a transverse section through the window—switch—door trim arrangement of FIG. 4, illustrating the switch shown in FIG. 1 in situ and in the open condition;

FIG. 6 illustrates the switch in FIG. 5 when closed by displacement of the window;

FIG. 7 is a circuit diagram of an alarm system for a vehicle incorporating several pressure operated switches according to the present invention.

DETAILED DISCUSSION OF PREFERRED EMBODIMENT

Figure 1:
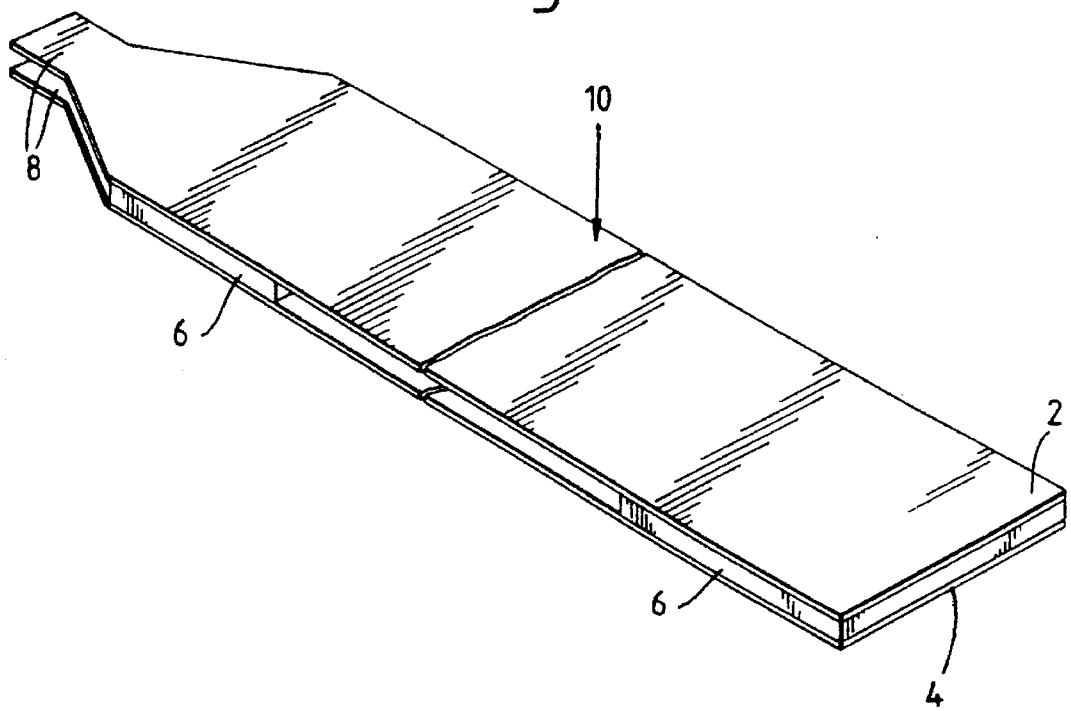
FIG. 1 is a diagrammatic illustration of a pressure operated switch according to the invention.

Referring to FIG. 1 the switch comprises a first contact 2 and a second contact 4, each consisting of a rectangular brass strip 0.2 mm in thickness. Each contact is 43 mm long and 9 mm wide, and the contacts are spaced apart from one another in a substantially parallel arrangement by means of the spacer elements 6 located between the first contact 2 and the second contact 4. The spacer elements 6 are made from 9 mm squares of an insulating material, having a thickness of 0.6 mm, so that the switch is open in the absence of applied pressure. Each strip is cut so as to leave a tab of material 8 narrower than the main body of the strip at one of its ends to provide a convenient site for attachment of wires by crimping the end of the tab, thereby facilitating connection of the switch into a circuit. The second contact 4 is attached to a fixed surface in use, so that the switch is closed, and enabled to complete a circuit in which it is incorporated, by movement of the first strip into contact with the second strip as a result of applied pressure in the general direction of the arrow 10.

Figure 2:
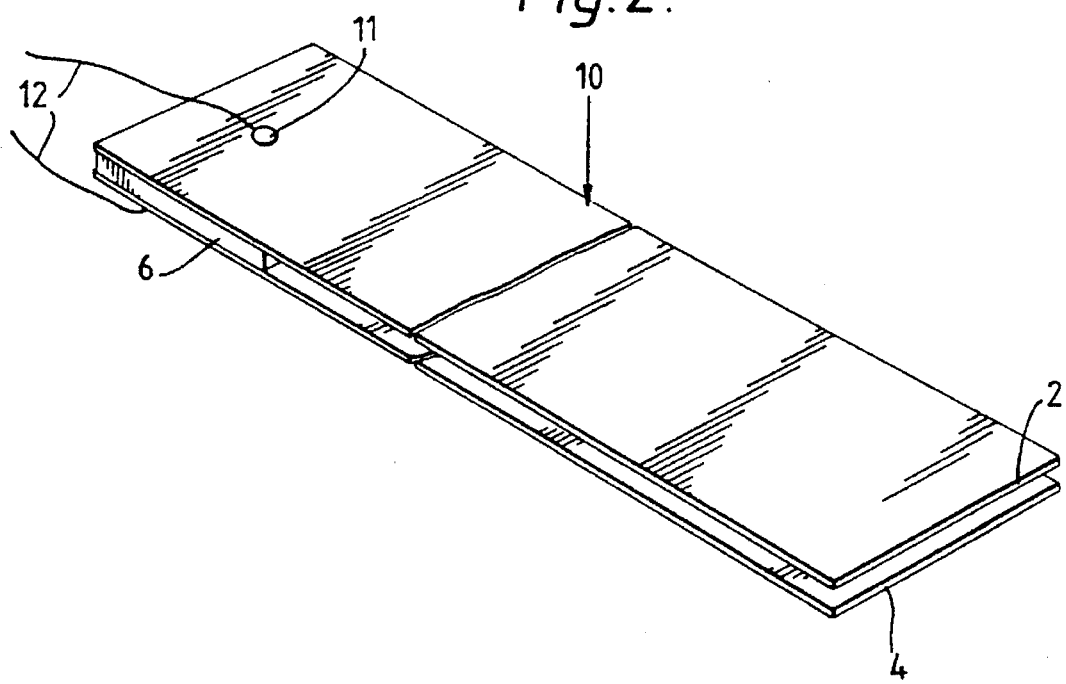
FIG. 2 is a diagrammatic illustration of an alternative configuration of a pressure operated switch according to the invention.

FIG. 2 illustrates an alternative embodiment of switch wherein the brass strips comprising the first contact 2 and second contact 4 are spaced apart from one another by means of a single spacer element 6 of insulating material located between them and at one end. The second contact 4 is attached to a fixed surface in use and the first contact 2 functions as a cantilever, with the switch being closed by movement of the free end of the first contact 2 into contact with the second contact 4 as a result of applied pressure in the general direction of the arrow 10. Such a switch is generally more sensitive than the switch illustrated in FIG. 1, requiring a smaller force for closure given the same materials and dimensions. Disadvantageously, the switch is more susceptible to being closed by shock induced vibration rather than a direct pressure on the first contact 2.

As an alternative to the tab of material 8 illustrated in FIG. 1, the switch is provided with means for connection into a circuit in the form of conducting wires 12 which have a soldered joint 11 to the brass strips 2, 4.

Figure 3:
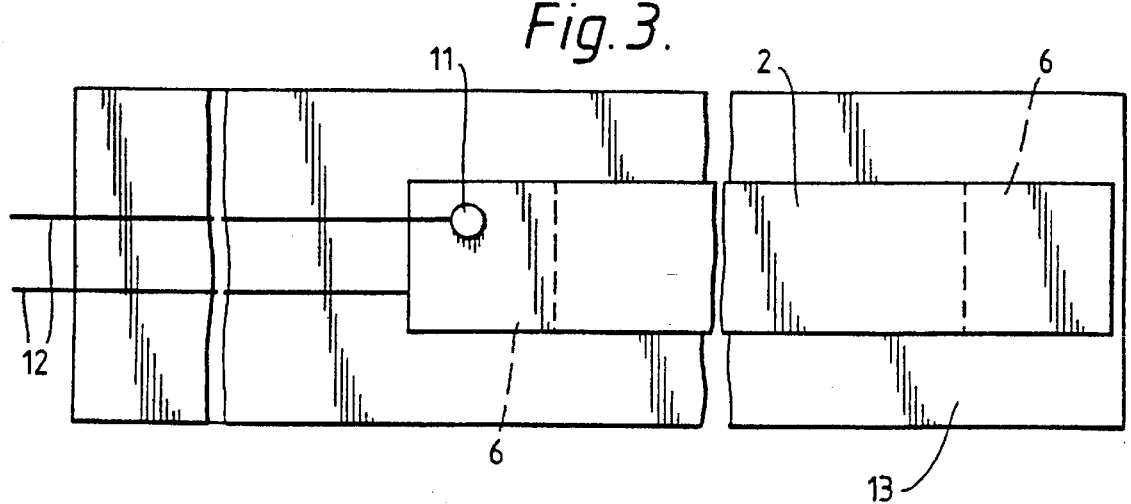
FIG. 3 is a plan view of an alternative configuration of a pressure operated switch according to the invention.

FIG. 3 illustrates an alternative embodiment of switch in plan view. The switch comprises a first contact 2 and a second contact (not shown on the FIG.), each consisting of a rectangular brass strip 0.2 mm in thickness. The contacts are spaced apart from one another in a substantially parallel arrangement by means of the spacer elements 6 of an insulating material located between the first contact 2 and the second contact, so that the switch is open in the absence of applied pressure. The switch is provided with means for connection into a circuit in the form of conducting wires 12 with a soldered joint 11 to the brass strips.

The whole switch is encased in a polythene sheath 13 to provide protection from moisture which could cause deterioration in switch condition over time. The sheath 13 additionally provides mechanical support for the wires 12, which helps to prevent local fracture of the connecting wire around the soldered joints 11 due to vibration.

Figure 4:
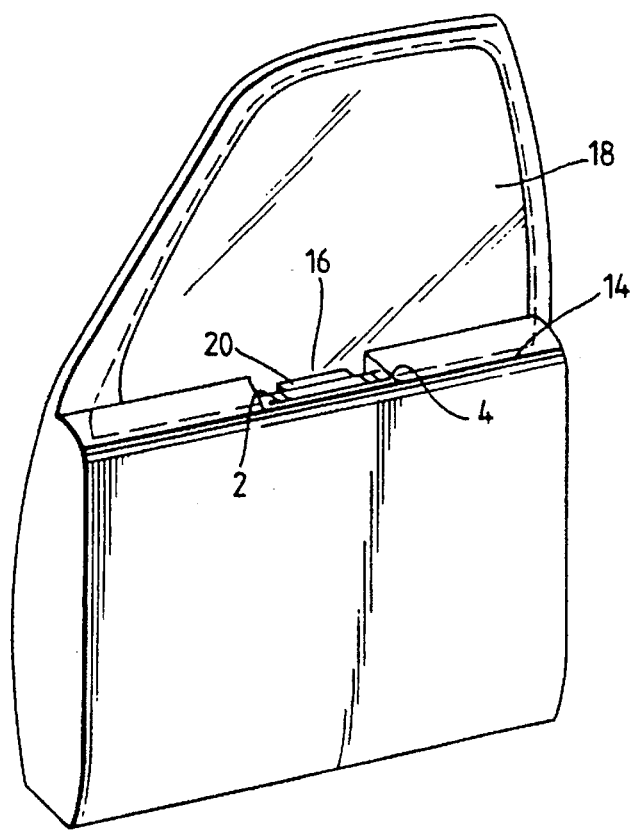
FIG. 4 illustrates a pressure operated switch incorporated within a vehicle in accordance with the invention.

FIG. 4 illustrates the preferred location for a switch adjacent to a vehicle window. The second contact 4 is attached to the surface of the vehicle door trim 14 so that the switch is located between the vehicle door trim and the internal surface 16 of the window. Attached to the first contact 2 is a foam rubber strip 20 which enables an inward displacement of the window resulting from a force applied to its external surface to be transmitted to the first contact 2.

The function of this arrangement is illustrated more clearly in FIGS. 5 and 6. In FIG. 5, the foam rubber strip 20 is attached to the first contact 2, and is of sufficient width that it extends almost to the internal surface 16 of the window 18. The second contact 4 is fixed to the internal surface of the vehicle door trim 14. A force applied to the external surface 17 of the window 18 in the general direction of the arrow 22 causes an inward displacement of the window. The force is thus transmitted from the internal surface 16 of the window to the foam rubber strip 20, thereby causing an inward displacement of the first contact 2. The switch is thus enabled to close under the action of a predetermined critical force applied to the window 18.

The critical force required to close the switch can be adjusted by varying the configuration of switch and foam rubber strip, being dependent principally on the spacing between the contacts 2, 4 (provided that if this spacing is altered, the width of the foam rubber strip 20 is altered accordingly so that it remains of sufficient width that it extends almost to the internal surface 16 of the window 18).

FIG. 6 illustrates the closed condition. The window 18 has been displaced inwards under the action of a force applied in the direction of the arrow 22, such that its internal surface 16 has moved from its former position 24. The foam rubber strip 20 is compressed between the internal surface 16 of the window and the first contact 2, and has displaced the first contact 2 so that it is contact with the second contact 4 thereby closing the switch.

To provide an alarm system for a vehicle, a number of switches as described above are arranged in a circuit as illustrated in FIG. 7. Four switches according to the present invention 26 are shown arranged in parallel and connected with a power source 28, detection means 32 capable of responding to the electrical signal enabled to pass through the circuit when the circuit is completed, and earth 30, such that closure of one switch 26 completes the circuit and generates a detectable signal at the detection means 32. On detection of such a signal, the detection means activates the alarm 33 and vehicle immobilization device 40. The power source 28 and earth connection 30 ape most simply the positive and earth terminals of a conventional vehicle battery. The switches 26 are additionally connected in parallel to conventional door switches, of the type configured to be closed when the door or the like to which they are attached is open, these switches 34 being located at the bonnet and boot.

Also provided in FIG. 7 is an array of conventional door switches 36 associated with the vehicle passenger doors, connected in parallel between the power source 28 and earth connection 30 but connected through a delay detector 38 which is configured to activate the alarm 33 a specified time interval after a signal resulting from closure of one of the switches 36 is detected. Thus closure of any one switch 36 resulting from opening of its associated door will activate the alarm 33 but only after a specified time delay. This delay provides an opportunity to deactivate the alarm and prevent its accidental triggering following a legitimate entry.

In many existing vehicles a simple alarm system incorporating most or all of the power source 28, detection means 32, delay detector 38, switches 34, 36 and alarm 33 will already be present, so that incorporation of the switches 26 provides an extremely cheap and simple method of gaining additional protection against unauthorized intrusion into a vehicle. However, all the listed components of the circuit in FIG. 7 are readily available to provide a simple but effective vehicle intruder alarm system for any vehicle.

I claim:

1. A vehicle intruder detection system comprising at least one pressure operated switch connected into a circuit with an electrical source and detection means capable of detecting variations in the state of the circuit, wherein each switch has a first, movable contact and a second, fixed contact, each contact comprising a strip of electrically conductive material, and at least one spacer element of electrically insulating material located between the first contact and the second contact whereby contacts are spaced apart from one another, the second contact being attached to a fixed surface located within a vehicle interior so that the first contact is located in proximity, but not fixedly attached, to an internal face of a vehicle window, such that the application of a predetermined force to the external surface of the protected window causes the first and second electrical contacts to be brought into contact by displacement of the first electrical contact thereby actuating the switch.

2. A system according to claim 1 wherein each contact further comprises a tab of electrically conductive material narrower than the remainder of the contact and extending from one end thereof.

3. A system according to claim 1 wherein each switch further comprises electrical connection means for connecting the switch into a circuit, comprising a wire of conducting material connected to each contact.

4. A system according to claim 1 wherein each switch is contained within a water-impermeable sheath.

5. A system according to claim 1 wherein a force transmission means of flexible, resilient material is connected to the first contact so that in use the force transmission means is located between the window and the first contact thereby enabling the inward movement of the window caused by an external force thereon to be transmitted to the first contact of the switch.

6. A system according to claim 1 wherein the fixed surface to which the second contact of the at least one switch is attached comprises the internal surface of the vehicle door trim adjacent to a window.

7. A system according to claim 1 comprising a plurality of switches connected in parallel to each other, such that actuation of any one switch causes the circuit to be completed.

8. A system according to claim 1 wherein the detection means incorporates an alarm which is actuated on detection of a change in current through the system.

9. A system according claim 1 wherein the detection means incorporates a vehicle immobilisation means which is actuated on detection of a change in current through the system.

* * * * *